United States Patent [19]

Chureau

[11] Patent Number: 4,631,850
[45] Date of Patent: Dec. 30, 1986

[54] APPARATUS FOR SORTING OUT DEFORMED OR BROKEN FISH HOOKS ON SO-CALLED TRAWL LINES

[76] Inventor: Bernard Chureau, 9 Rue du Fan, 44420 La Turballe, France

[21] Appl. No.: 708,423

[22] Filed: Mar. 5, 1985

[51] Int. Cl.⁴ ............................................. A01K 79/00
[52] U.S. Cl. ............................................. 43/4; 43/4.5; 43/27.4
[58] Field of Search ............... 43/4.5, 4, 26.1, 27.4, 43/43.16

[56] References Cited

U.S. PATENT DOCUMENTS

| 2,518,590 | 8/1950 | Andrist | 43/4 |
| 2,670,556 | 3/1954 | Hopkins | 43/4 |
| 3,377,733 | 4/1968 | Godo | |
| 4,015,359 | 4/1977 | Andrews | 43/4 |
| 4,068,399 | 1/1978 | Bjorshol | 43/4.5 |
| 4,266,359 | 5/1981 | Alex | 43/27.4 |
| 4,277,905 | 7/1981 | Huse | 43/4 |
| 4,453,330 | 6/1984 | Jorgensen-Dahl | 43/27.4 |

FOREIGN PATENT DOCUMENTS

| 988545 | 5/1976 | Canada | 43/4 |
| 2370428 | 6/1978 | France | |
| 2545322 | 11/1984 | France | |
| 2545323 | 11/1984 | France | |

Primary Examiner—Nicholas P. Godici
Assistant Examiner—Kurt Rowan
Attorney, Agent, or Firm—Young & Thompson

[57] ABSTRACT

The invention relates to an automatic apparatus for sorting out the deformed fish hooks or those having a broken point on the so-called trawl line. The apparatus comprises a fish hook positioning device bringing the fish hook (3) to circulate by being pulled by a leader (2) and guided by the shank (4) in a slide (15), where the transverse section corresponds. The slide is of a transverse section corresponding to the normal curvature (5) of the fish hook when the shank (4) is disposed in the axial direction of the channel of slide (15); the point and barb (6) circulating inside the slide and at least a first detector (40) of any type detects, in the case of a non broken fish hook, the presence of the point and the barb (6), other detectors being adapted for detecting the deformation of the shank and a selecting device (16) controlled by said detectors discriminates the non usable fish hook. The invention allows the automatic checking of the state of trawl lines.

10 Claims, 14 Drawing Figures

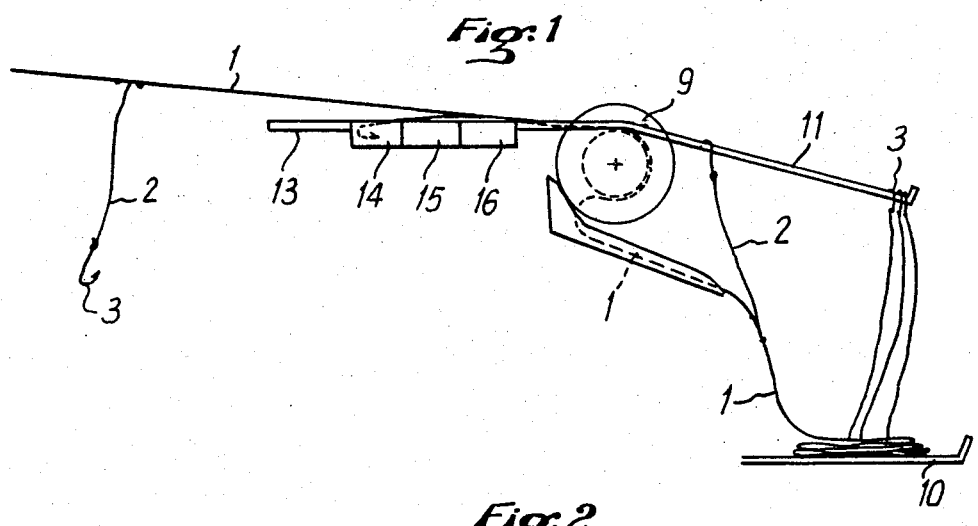
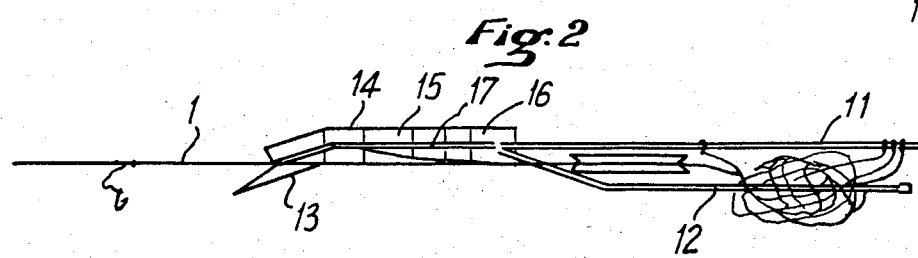
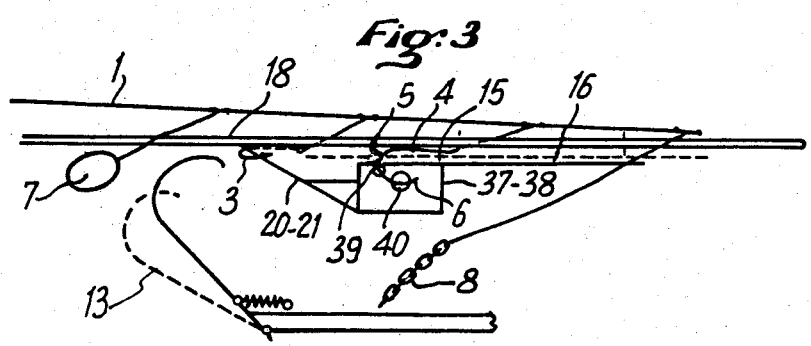
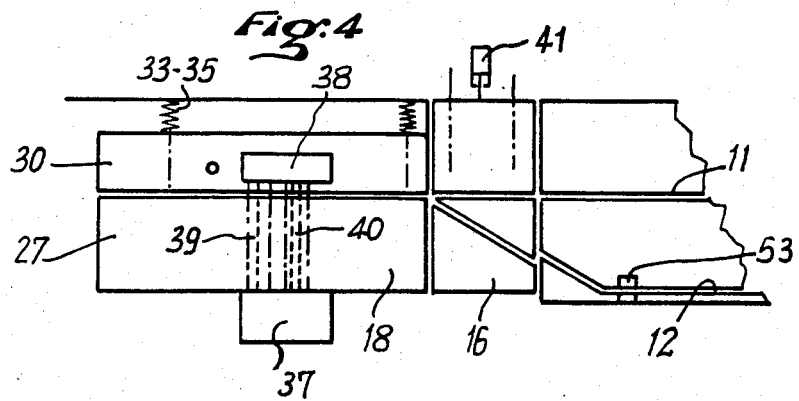

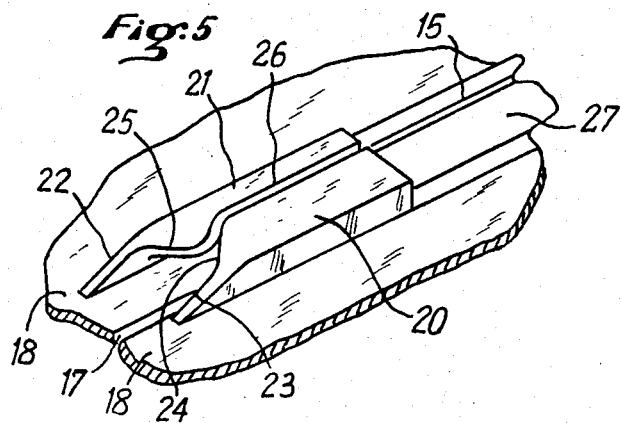
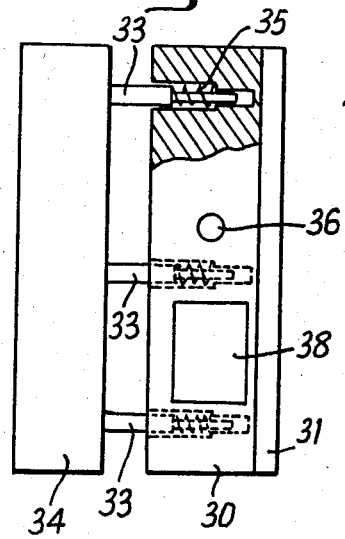
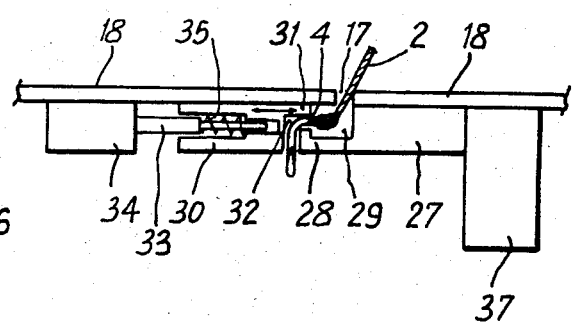
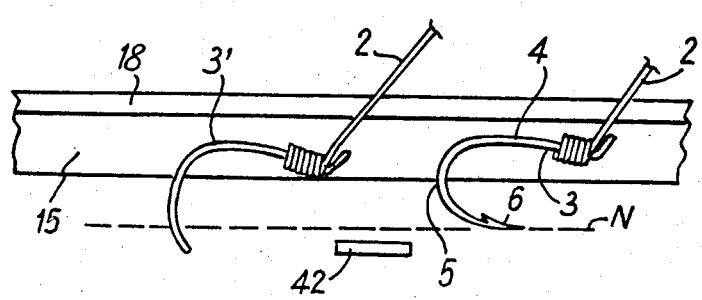
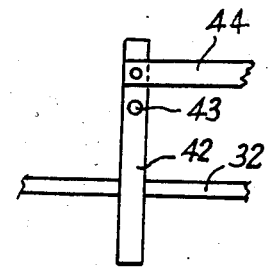

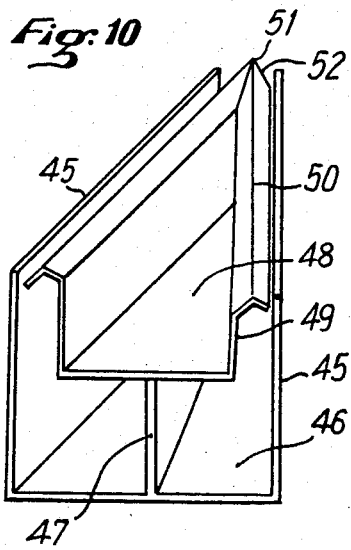
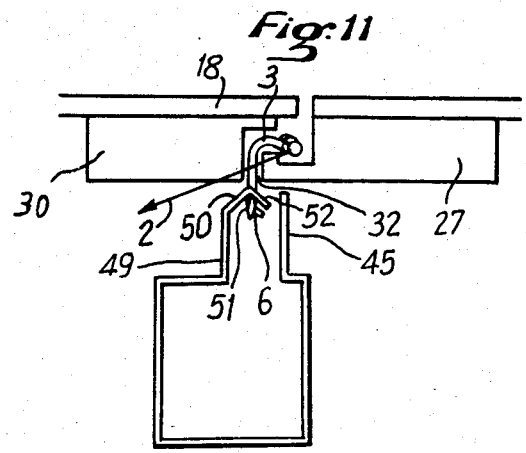
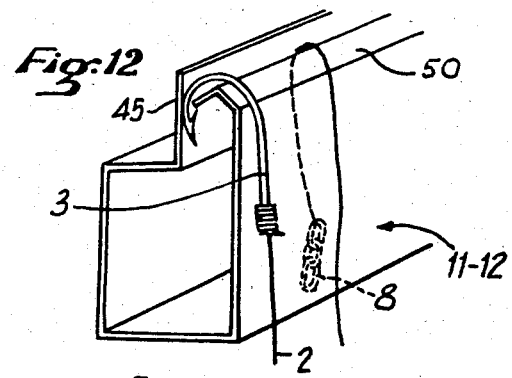
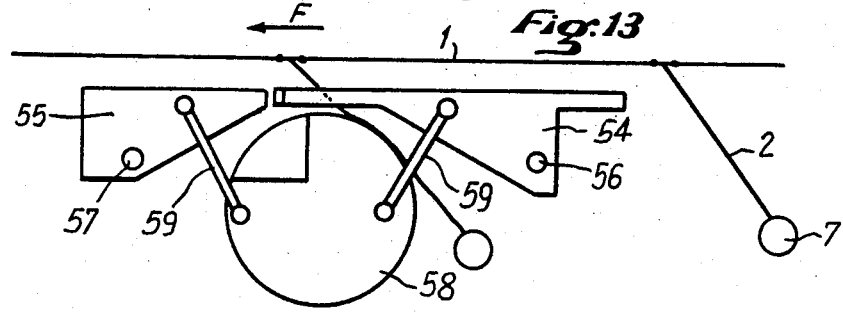
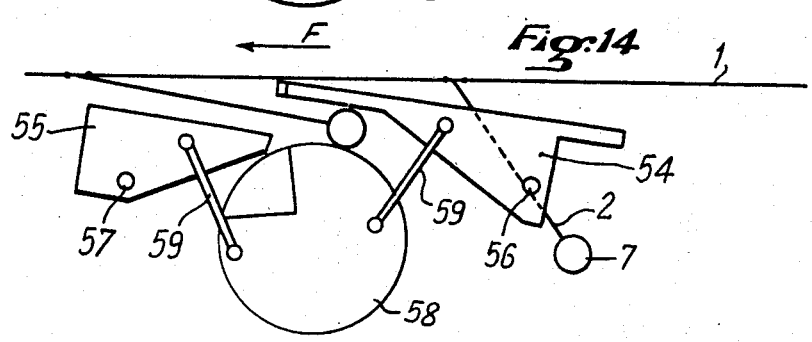

APPARATUS FOR SORTING OUT DEFORMED OR BROKEN FISH HOOKS ON SO-CALLED TRAWL LINES

FIELD OF INVENTION

The trawl line is a standing line for sea-fishing, formed of a main line on which are fixed, from place to place, leaders carrying each at their other end a fish hook. The main line has a length of several hundreds of meters and each trawl line carries several hundreds of fish hooks, the average spacing being between three to five meters with a leader of a length of one meter to one meter fifty.

BACKGROUND OF PRIOR ART

For automating the trawl line fishing, such automation being made necessary by the present speeds for running out and hauling aboard or turning the trawl line, baiting machines have been proposed, such as that disclosed in French Pat. No. 2,545,322 dated May 4, 1983, which fix the bait to the fish hook at the moment of the paying out of the line, and fish unhooking machines such as that disclosed in French Pat. No. 2,545,323 dated May 4, 1983, which remove the fish and the remaining bait from the fish hook while the main line is hauled in by a barring gear and store the trawl line in a storage magazine, the line being hung by its hooks suspended from a rail. The baiting machine takes over the trawl line from the magazine. If it is easy to detect fish hooks the leader of which has been cut by the trimming machine and those broken at the base of the shank because their leaders hang down underneath the line, it is impossible to detect the fish hooks which are opened or deformed because the fish hooks defile at a cadence which can reach 2000 hooks per hour.

Moreover, for certain types of fishing and for avoiding that the baits lie on the sea-bed, the trawl line is provided with floats and sinkers, generally a few chain links, which are alternately interposed between the fish hooks and fixed to the main line by leaders.

OBJECTS AND SUMMARY OF INVENTION

The present invention has for an object to provide an apparatus for automatically sorting out the fish hooks which are deformed or the point of which is broken on the so-called trawl lines, either between the output from the fish unhooking machine and the storage magazine of the trawl line, or during a checking operation, on board or on the ground, of the state of the fish hooks of the trawl line.

It has also for an object to provide such an apparatus in which the floats and the sinkers of the trawl line are cleared from the input of the sorting apparatus.

The apparatus according to the invention substantially comprises, in combination, a fish hook positioning device causing the fish hook to move, while being pulled by the leader and guided by its shank, in a slide the transverse section of which corresponds to the normal curvature of the fish hook when the shank is disposed in the axial direction of the slide channel in which opens the passage slot for the leader, the point or barb moving outside the slide, a first detector of any type for detecting at least the presence of the point and of the barb in the position corresponding to the non deformed fish hook and/or the absence of an increase of the curvature and a selecting device under the control of said detector for eliminating the deformed or broken fish hooks.

The selecting device can separate the good fish hooks from the deformed fish hooks by directing, via a switch, the deformed fish hooks to a separate storage magazine, it can eject the deformed fish hooks by cutting them from the leader or it can signal the presence of a faulty fish hook and/or stop the winding of the main line.

The positioning device of the fish hook can be any device of some known type providing the engagement, with a definite spacial orientation, of the fish hook in the guiding slide. A preferred embodiment is disclosed in French Pat. No. 2,545,322 dated May 4, 1983 in the name of the Applicant for a "Baiting machine for trawl line fishing" and it will be described in detail hereafter.

However, the invention is not limited to said positioning device, nor to trawl lines with so-called inverted fish hooks for which the guiding slide of said positioning device is designed, the section of the slide being adaptable to the particular type of fish hook used, which can be guided with the point having any orientation.

The detector providing the detection of the presence of the fish hook or of the barb in the position corresponding to the non deformed fish hook can be an occulting detector, the point and the barb passing through the beam between the transmitter and a sensor of radiation of any type, a mass volumetric detector, a pneumatic detector, etc. The detector can also be sensitive to an opening of the cuvature of the fish hook. Indeed, in practice, the breaking of the point or barb is almost always accompanied by an increase of the curvature or "opening" of the hook. Consequently, a fish hook made faulty by the breaking of its point and/or barb will almost necessarily present a free end more remote from the shank than the point of a normal fish hook. Therefore, instead of detecting the presence of the point and barb, it is possible to detect a spacing superior to the spacing between the shank and point of a normal fish hook, of the fish hook subjected to the detection. This can be obtained either by the hereabove detectors or by a mechanical detector cooperating with the guiding slide in order to be caught by the point or free end of an opened fish hook.

Finally, a fish hook can be made less efficient by a deformation of the shank and/or of its curvature, for example due to a torsion or a compression of a so-called inverted fish hook. Such a deformation is made apparent by a non conformity of the fish hook shape with the theoretical section of the guiding slide, which has to present rather narrow tolerances in order to obtain a positioning of the point sufficiently accurate for allowing the detection. The narrow tolerances of the guiding slide section risk causing jamming of the fish hook, if there is a deformation, even slight. Consequently and according to another feature of the invention, some portions at least of the wall defining the guiding slide are resiliently mobile in a direction increasing the section. Said displacement can be used, when superior to a given amplitude, for detecting a deformation of the shank and/or curvature and control a second detector associated with the first detector for controlling the selecting device.

According to another feature of the invention, a separating device, for moving aside from the input of the positioning device the sinkers and floats, is provided upstream of the sorting apparatus. Said separating device is for example made of a door which is opened, in order to let the sinker or float pass, by the volume of the element itself, guided along a path of travel bringing it in contact with said door. Preferably, the door is a swinging double-wing door, the pivoting motions in the same direction being synchronized in order to ensure the passage slantwise between the edges of the two wings of the element pushed against one of the wings.

According to still another feature, the wings are each made of two elements separated by an interval for the passage of the leaders, the elements of each wing and the two wings being synchronized in their displacements by rocker bars eccentrically articulated on a cylinder forming a guide parallel to the articulation axes of the wings and about which are deviated the ballast and float.

BRIEF DESCRIPTION OF DRAWINGS

The invention will now be described in more detail with reference to the accompanying drawings wherein:

FIG. 1 is a side elevation schematic view of the whole apparatus,

FIG. 2 is a general schematic plan view,

FIG. 3 is an elevation schematic view of the main portion of the apparatus, and

FIG. 4 is a schematic plan view thereof,

FIG. 5 is a perspective view from underneath of the positioning nose of the slide, FIG. 6 is a transverse sectional view of the slide, and FIG. 7 is a view from underneath of the mobile rail of said slide, FIG. 8 is a schematic elevation view of a mechanical deformation detector and FIG. 9 is a detailed plan view thereof, FIG. 10 is a perspective view from downstream of the switching device, FIG. 11 is a view explaining its operation, FIG. 12 is a view of the storing rail for the fish hooks, FIG. 13 is an elevation schematic view of the ballasts and floats separator, and FIG. 14 illustrates the separator in the opened position.

DETAILED DESCRIPTION OF INVENTION

In the drawings, reference 1 designates the master line of the trawl line, 2 the leaders and 3 the fish hooks which are of the so-called "inverted" type in which reference 4 designates the shank, 5 the curvature and 6 the point and barb. Reference 7 designates the floats and 8 the ballasts formed of chain sections.

In the embodiments shown, the apparatus is mounted in front of the warping winch 9 which hauls the master line in order to pile it up on a plate 10, the congruent fish hooks being stored on a rail 11 and stopped by an end flexible abutment and the non congruent fish hooks being stored on a rail 12.

The apparatus as such comprises, upstream and in the downstream direction, a separator 13 for pushing aside the sinkers and floats of the sorting apparatus, a positioning device 14 orienting the fish hook so that it engages in the correct direction a slide 15 on which are mounted the detectors, a switch 16 controled by the detectors for directing the fish hooks onto rail 11 or onto rail 12 according to the result of the detections. These various constituent parts are described in more detail hereafter, whereby the separator can be omitted if the trawl line does not include sinkers or floats.

The apparatus is of the type in which the fish hook moves with its point down in order to facilitate the positioning of the fish hooks 3 which present themselves suspended from the leaders. Master line 1 circulates above the apparatus and sideways, the leader 2 passing through a slot 17 in the upper table 18 of the apparatus.

The positioning apparatus 14 (FIG. 5) comprises, under slot 17, a large diameter transverse tube (not shown) on which the point of the fish hook pulled by the leader is deflected to the right or to the left. Above said tube are the points of the two noses of rails 20, 21 of the slide. Said noses include a ramp 22–23 which unbends or straightens out the point 6 of the fish hook in order to have it pointing downwardly and the curvature 5 of the fish hook cooperates, according to whether the fish hook has been deflected to the left or to the right, with the engagement cams 24–25 which rotate the plane of curvature about shank 4 which is pulled toward the lower face of table 18 by leader 2 engaged in slot 17. The fish hook is thus engaged with the plane of its curvature 5 passing in slot 26. The rail noses are prolongated under table 18 by the slide 15 of reduced height in order to disengage the point or curvature of the fish hook.

Slide 15 (FIGS. 6 and 7) is composed of a fixed rail 27 attached under table 18 and the side face of which coincides substantially with the edge of slot 17. Rail 27 is prolongated underneath slot 17 by a side L-shaped wing 28 forming a channel 29 for guiding the pallet or ring and the shank 4 of the fish hook. The slide is completed by a mobile rail 30 defining with its nose 31 the upper side portion of channel 24 and which, by its side face ending in the nose, forms an L-shaped slot 32 for the passage of the root of the fish hook curvature 5. Said rail 30 is guided in a mobile way underneath plate 18 in order to be moved away from rail 27 and to widen slot 32, by guiding spindles 33 carried by a base 34. Rail 30 is biased toward rail 27 by compression springs 35.

Due to this constitution of the slide, the deformed fish hook the shank of which is for example twisted can pass through the slide by drawing apart rail 30 from rail 27. Said displacement can, when it exceeds a certain tolerance limit, be detected by a position sensor 36 of any known type, for example a photo-sensitive cell cooperating with a transmitter (not shown) carried by base 34.

With slide 15 are associated two opto-electronic blocks, one being a transmitter 37, the other a receiver 38, placed on either side of the slide. The receiving block 38 is shown carried by the mobile rail 30, but such a disposition is optional. The opto-electronic groups 37–38 have two detection beams 39 and 40 (FIGS. 3 and 4). Beam 39 detects the passage of the curvature 5 and beam 40 the presence of the point and barb. As indicated hereabove, the detection can be made by a plurality of known systems with photo-resistors, photo-diodes, photo-sensitive cells, or with ultrasonic, infrared, laser, mass volumetric detection, pneumatic detector systems, etc.

The signals obtained are treated in order to determine whether the point and barb 6, the presence of which corresponds to a certain intensity of beam 40, exist and are in a correct position relative to the curvature 5 detected by beam 39. The output corresponding to a congruent fish hook, associated with the absence of output from detector 36, leaves the switching device 16 in a neutral position directing the fish hook toward rail 11 while the output corresponding to a non congruent fish hook or an output from detector 36 determines the displacement of switch 16 in order to direct the non congruent fish hook onto rail 12.

In FIG. 4, the switch 16 is replaced by a jack or a solenoid 41.

As hereabove explained, the breaking of the point and barb 6 corresponds almost always to an "opening" of the curvature 5. In FIG. 8 has been shown the position in the slide of a congruent fish hook 3 and of an opened fish hook 3'. The point 6 of fish hook 3 has a path of travel relative to the slide which is indicated by line N while the point of the opened fish hook 3' is at a greater distance. Therefore, it is possible to mount under line 15 a mechanical sensor 42, for example a small lever articulated at 43 underneath the slide and which is very near level N. Fish hooks 3 do not catch the sensor while the point of the opened fish hooks 3' catch it and entrain it, whereby the pivotal motion can entrain a small transmission rocker bar 44 tipping the switch in order to send the fish hook on rail 12.

The switch can be made for example as shown in FIGS. 10 and 11. It includes two walls forming side counter tongue-rails 45 connected by a base plate 46. Said base plate carries via a vertical metal sheet 47 the base plate of the tongue-rail point bent over along its edges in order to form two vertical walls 49 the upper edge of which is folded over at 50 in an angle rail. The two angle rails 50 are connected at a point 51, the edges 52 of the outer wings of the rail being obliquely cut out from the point. The operation of the switch will be described hereafter with reference to FIG. 11 in which only one branch of the switch has been shown for the clarity of the drawing. The switch is mounted immediately downstream of the slide at the end of rails 27 and 30 so that the fish hook 3 is brought to the point 51 of the switch by being guided in slot 32. Point 51 of the switch is brought substantially in coincidence with the end of one or the other of the edges of slot 32 so that the edge 52 of rail 50 on which the fish hook has to be directed intersects the width of slot 32. Point 36 of the fish hook pulled by the leader 2 engages inside the angle which forms rail 50 and the curvature comes into abutment against edge 52, which pivots the fish hook the curvature of which engages the interval between the edge of rail 50 and the wall forming the side counter tongue-rail 45. When fish hook 3 is on rail 11 or 12 which follows the switch and is no longer pulled by its leader, it takes, on the rail which has a section similar to the rails of the switch, the position shown in FIG. 12. The ballasts 8 and floats 9 can be stored on the same rails, their leaders being reintroduced downstream of the switch in the interval between the edge of rail 50 and the side wall forming the counter rail 45.

If the normal position of the switch is that sending the fish hook onto rail 11 for the congruent fish hooks, a detector 53 detects the passage of the non congruent fish hook on rail 12 in order to command the return of the switch to the normal position (FIG. 4).

A non limiting embodiment of the separator 13 is shown in FIGS. 13 and 14. Line 1 moves in the direction of arrow F and floats 7 which are the only elements shown are suspended underneath the line by their leader 2 which engages in a slot corresponding to slot 17. Over the length of the separator, said slot separates the two half-wings 54, 54 and 55, 55 respectively, only one of the half-wings 54-55 being shown in the drawing. Said half-wings 54-55 are rotatably mounted about half-axes 56-57, the two half-axes 56 and the two half-axes 57 leaving between them an interval for the free passage of leaders 2 which can retain not only the ballasts or floats to be passed above the level of table 18 which is flush with the upper face of the half-wings, but the fish hooks which have to remain underneath the level of table 18. Between axes 56 and 57 is rotatably mounted a cylinder 58 and the half-wings 54, 55 are connected to said cylinder by rocker bars 59 articulated on the side faces of cylinder 58, the space between the periphery of said cylinder 58 and the lower faces of the half-wings 54-55 being such that the fish hooks can pass freely but that the sinkers and floats passing around cylinder 58 come on the contrary in contact with the lower face of half-wings 54 and rotate them about their axis 56. The rotation of the half-wings 54 is synchronized regarding each other and transmitted to cylinder 58 by the rocker bars 59, said rotation being also transmitted by the rocker bars 59 corresponding to the half-wings 55 the point of which moves down so that the float 7 or the sinker 8 which slides on the surface of cylinder 58 engages above the upper surface of the half-wings 55. After the passage of a sinker or a float, the half-wings 54-55 return to the position of FIG. 13.

I claim:

1. An apparatus for sorting out deformed fish hooks on trawl lines, the fish hooks having a leader connected to a shank terminating in a curvature that terminates in a barb and a point, comprising a fish hook positioning device causing the fish hook to move, while being pulled by the leader and guided by its shank, in a slide the transverse section of which corresponds to the normal curvature of the fish hook when the shank is disposed in the axial direction of a channel of the slide in which opens a slot for the passage of the leader, the point and barb circulating outside the slide, a first detector for detecting at least the presence of a fish hook of normal configuration, and a selecting device under the control of said detector for deflecting a fish hook of abnormal configuration.

2. An apparatus according to claim 1, wherein the selecting device separates the normal fish hooks from the abnormal fish hooks by directing, via a switch, the abnormal fish hooks to a separate storage magazine.

3. An apparatus according to claim 1, comprising a fish hook positioning device which ensures the engagement, with a definite spatial orientation, of the fish hook in the guiding slide.

4. An apparatus according to claim 1, wherein the detector is a detector of the transmitter and receiver type for radiation.

5. An apparatus as claimed in claim 1, wherein the detector is sensitive to the opening of the curvature of the fish hook.

6. An apparatus according to claim 5, wherein the detector is a mechanical detector, which is caught by the point of a deformed fish hook circulating in guiding slide.

7. An apparatus according to claim 1, wherein at least a portion of a wall defining the guiding channel of the fish hook, of the slide is resiliently mobile in a direction increasing the section of the channel so as to be able to detect a deformation of the fish hook and to control the selecting device.

8. An apparatus according to claim 1, wherein a separating device moves sinkers and floats away from the positioning device.

9. An apparatus according to claim 8, wherein the separating device comprises a door which is opened, in order to let sinkers or floats pass.

10. An apparatus according to claim 9, wherein the door is a swinging double-wing door whose pivoting motions in the same direction being synchronized in order to ensure passage slantwise between the edges of the two wings of the sinker or float pushed against one of the wings.

* * * * *